(12) United States Patent
Takasu et al.

(10) Patent No.: US 7,224,889 B2
(45) Date of Patent: *May 29, 2007

(54) EDITING APPARATUS AND DATA EDITING METHOD

(75) Inventors: Nobuyuki Takasu, Kanagawa (JP); Tsuyoshi Oda, Chiba (JP); Masao Sasaki, Kanagawa (JP); Toshiaki Setogawa, Kanagawa (JP); Kentaro Tanaka, Kanagawa (JP); Ayato Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/078,041

(22) Filed: Mar. 11, 2005

(65) Prior Publication Data

US 2005/0158023 A1    Jul. 21, 2005

Related U.S. Application Data (63) Continuation of application No. 09/875,366, filed on Jun. 5, 2001, now Pat. No. 6,868,228, which is a continuation of application No. 08/935,207, filed on Sep. 22, 1997, now abandoned.

(30) Foreign Application Priority Data

Sep. 25, 1996   (JP)   ............................... P8-274200

(51) Int. Cl.
*H04N 5/91* (2006.01)
(52) U.S. Cl. ........................... 386/96; 386/98; 386/125
(58) Field of Classification Search ................. 386/48, 386/95, 96, 98, 125, 126, 52
See application file for complete search history.

(56) References Cited

U.S. PATENT DOCUMENTS

| 5,647,047 | A | | 7/1997 | Nagasawa | |
|---|---|---|---|---|---|
| 5,737,479 | A | | 4/1998 | Fujinami | |
| 5,742,732 | A | | 4/1998 | Kubo et al. | |
| 5,902,115 | A | | 5/1999 | Katayama | |
| 6,044,199 | A | * | 3/2000 | Oda et al. | ..................... 386/98 |
| 6,381,398 | B1 | * | 4/2002 | Yamauchi et al. | ............ 386/52 |
| 6,868,228 | B2 | * | 3/2005 | Takasu et al. | ................ 386/95 |

* cited by examiner

*Primary Examiner*—Huy Nguyen
(74) *Attorney, Agent, or Firm*—Frommer Lawrence & Haug LLP; William S. Frommer (57) ABSTRACT

In an editing apparatus, the work efficiency can be improved comparing to a conventional apparatus. Storage means (14) having a plurality of input ports and at least one output port; and control means (16) for controlling the recording areas of the storage means, in which the different recording area is respectively assigned to each of a plurality of encoding means (11 to 13) as a recording area in which the encoded data is stored, the recording area in which the encoded data has been stored is assigned to the multiplexing unit (15), and the recording area which is different from that of the encoded data is assigned as the recording area in which the multiplexed data is stored are provided, so that the storage means can be commonly used both in the encoding means and the multiplexing means. Thereby, the data transfer between encoding means and the multiplexing means does not performed. Therefore, the editing apparatus (10) which improves the work efficiency comparing to the convention apparatus can be realized.

1 Claim, 7 Drawing Sheets

| ITEMS | CONTENTS |
|---|---|
| 1 | TITLES |
| 2 | NUMBER OF VIDEO SIGNAL |
| 3 | NUMBER OF AUDIO SIGNAL |
| 4 | NUMBER OF PICTURES |
| 5 | SIGNAL SYSTEM OF VIDEO SIGNAL (NTSC/PAL) |
| 6 | ENCODING METHOD OF AUDIO SIGNAL (MPEG/AC-3) |
| 7 | BIT RATE OF VIDEO SIGNAL |
| 8 | BIT RATE OF AUDIO SIGNAL |
| 9 | BIT RATE OF PICTURE SIGNAL |
| ⋮ | ⋮ |
| n | OTHERS |

EDITING APPARATUS AND DATA EDITING METHOD

This is a continuation of application Ser. No. 09/875,366, filed Jun. 5, 2001, now U.S. Pat. No. 6,868,228, which is a continuation of application Ser. No. 08/935,207, filed Sep. 22, 1997, now abandoned, the entirety of which is incorporated herein by reference.

BACKGROUND OF THE INVENTION

1. Field of the Invention

This invention relates to an editing apparatus and a data editing method, and more particularly, is suitably applicable to an authoring apparatus for editing and making recording data composed of images or sounds which are recorded in an optical disk such as a digital video disk (DVD).

2. Description of the Related Art

An optical disk which is called a DVD has been proposed in which images, sounds, or the like are compressed and encoded to be recorded. The DVD adopts the moving picture experts group (MPEG) system which is standardized by the international organization for standardization (ISO) and so on, as the compressive-encoding method. Thereby, the high efficient compressive-encoding is performed to record images or sounds efficiently.

In connection, the compressive-encoding method is respectively defined for images and sounds in the MPEG system; it is defined by the method of combining the motion compensating prediction and the two-dimensional discrete cosine transform (DCT) with respect to the images, and is defined by the method using the sub-band encoding method with respect to the sounds.

A still picture, a moving picture, or sounds to be recorded is digital-encoded based on the MPEG system and the encoded data is multiplexed in the format of DVD standards to produce recording data which is recorded in the DVD. Such editing work is generally called authoring. The apparatus used in the editing work is called an authoring apparatus.

SUMMARY OF THE INVENTION

In view of the foregoing, and object of this invention is to provide an editing apparatus and data editing method which can improve the work efficiency.

The foregoing object and other object of the invention have been achieved by the provision of an editing apparatus for encoding a plurality of images or sounds and multiplexing the plural encoded data to produce recording data which is recorded in a recording medium. The apparatus comprises: storage means having a plurality of input ports and at least one output port; and control means for controlling the recording area of the storage means, in which a different recording area is assigned, as an area where the encoded data is stored, to each of the plurality of encoding means, the recording area in which the encoded data has been stored is assigned to the multiplexing means, and a recording area which is different from that of the encoded data is assigned, as an area where the multiplexed data is stored, to the multiplexing means.

In this way, the recording area of the storage means is controlled by the control means so that the encoded data and the multiplexed data are stored in one storage means. Thereby, the storage means can be commonly used in the encoding means and the multiplexing means, and a data transfer between the encoding means and the multiplexing means becomes unnecessary. Therefore, the work interruption in data transfer is eliminated and the time for editing work can be reduced.

Further, according to this invention, in a data editing method for encoding a plurality of images or sounds and multiplexing the plural encoded data so as to produce recording data which is recorded in a recording medium, a plurality of inputted images or sounds are encoded respectively and each of the encoded data is stored in a different recording area of the storage means; the encoded data is read from the storage means to be multiplexed so as to produce the multiplexed data; and the multiplexed data is stored as recording data in a recording area of the storage means which is different from that of the encoded data. Thereby, the storage means is used both for the encoding processing and the multiplexing processing so as to produce the recording data.

In this way, the encoded data or the multiplexed data are stored in one storage means at the time of producing the recording data and the storage means is used in common in each processing, so that a data transfer between respective processing becomes unnecessary. Thereby, the work interruption can be eliminated and the time for editing work can be reduced.

The nature, principle and utility of the invention will become more apparent from the following detailed description when read in conjunction with the accompanying drawings in which like parts are designated by like reference numerals characters.

DETAILED DESCRIPTION OF THE EMBODIMENT

Figure 1:
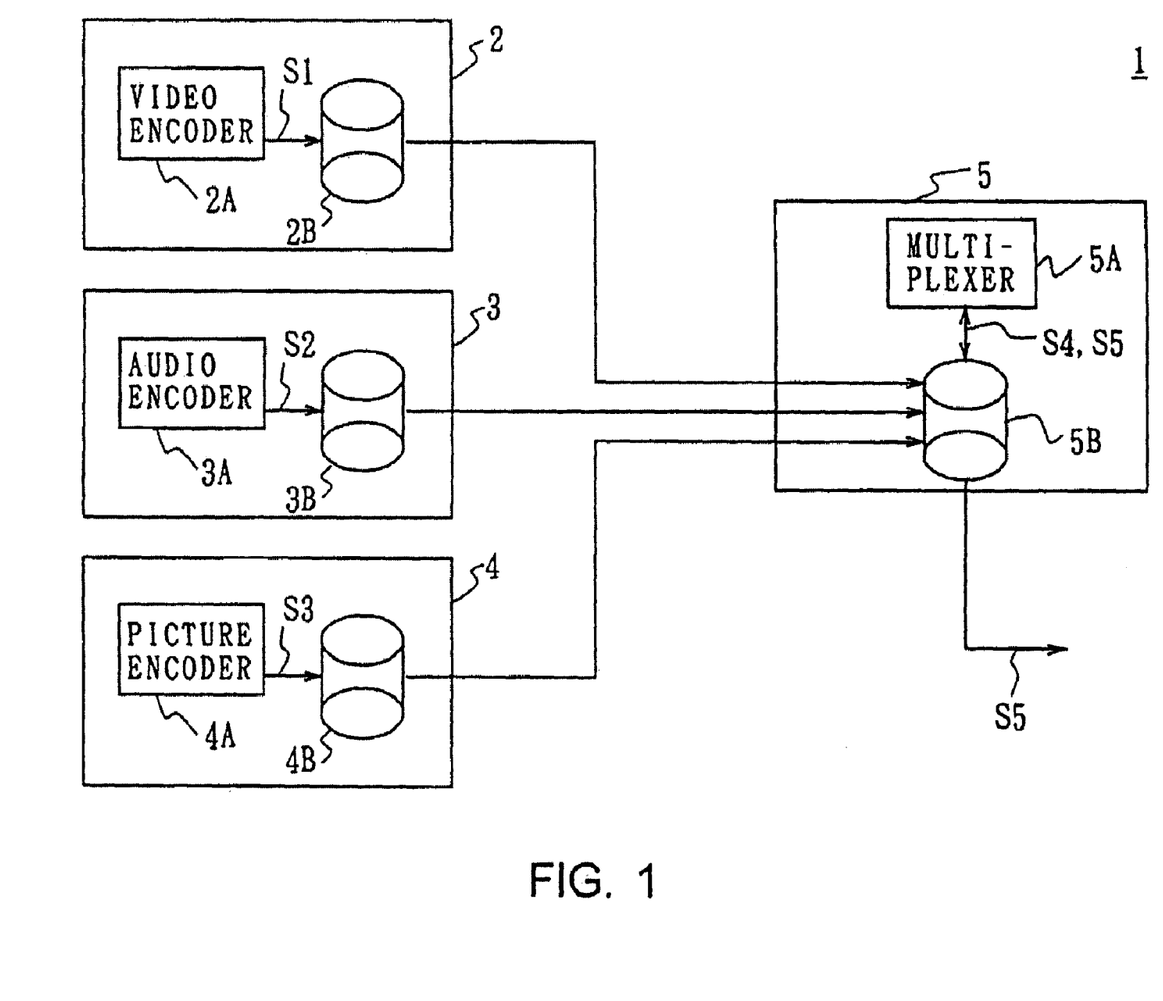
FIG. 1 is a block diagram showing the construction of an authoring apparatus.

FIG. 1 shows the construction of an authoring apparatus which is the premise of an editing apparatus according to this invention.

As shown in FIG. 1, the authoring apparatus 1, when roughly classified, is composed of a plurality of encoding units 2 to 4 for encoding a still picture, a moving picture, and sounds to be recorded, and a multiplexing unit 5 for multiplexing the encoded data encoded by the encoding units.

The encoding unit 2, which encodes a moving picture, successively encodes video signal by a video encoder 2A with the MPEG system, and successively stores the obtained video encoded data S1 in a storage unit 2B.

The encoding unit 3, which encodes sounds, successively encodes audio signal by an audio encoder 3A with the MPEG audio system, and successively stores the obtained audio encoded data S2 in a storage unit 3B.

The encoding unit 4, which encodes a still picture, successively encodes picture signal by a picture encoder 4A with the MPEG system or other encoding methods, and successively stores the obtained picture encoded data S3 in a storage unit 4B.

When all encoding processing of the encoding units 2 to 4 are completed, the multiplexing unit 5 accesses the storage units 2B to 4B of the respective encoding units 2 to 4, and reads the respective encoded data S1 to S3 to be once stored in a storage unit 5B. Then, the multiplexing unit 5 reads the respective encoded data S1 to S3 stored in the storage unit 5B as data to be processed S4, and supplies it to a multiplexer 5A. The multiplexer 5A receives the inputted data to be processed S4 which is successively multiplexed. The obtained multiplexed data S5 is successively stored in a different area of the storage unit 5B.

When all multiplexing processing is completed, the producing of recording data is terminated. In addition, when the processing of recording data is terminated, the multiplexed data S5 which has been stored in the storage unit 5B is transmitted to a decoding unit (not shown) for detecting whether or not the encoding processing or the multiplexing processing is normally performed. As a result, when it is normally performed, the multiplexed data S5 is transmitted to a recording unit (not shown) where it is down loaded on a tape recording medium, etc., and given to the DVD manufacturing process to be recorded in the DVD.

In this way, in the authoring apparatus 1, process is roughly classified into the encoding process for encoding data to be recorded, the multiplexing process for multiplexing the encoded data, and the detecting process for detecting the multiplexed data. The data recording and data transfer are performed between respective processes.

In the authoring apparatus of the above construction, the data transfer is performed between respective processes. There is an inconvenience that it takes much time because of a large amount of information of images or sounds so that the authoring work takes much time as a whole. Also, in each of encoding units 2 to 4, the next encoding processing can not be performed before each of the encoding data S1 to S3 which has been stored in each of the storage units 2B to 4B is read out by the multiplexing unit 5. Therefore, there is an inconvenience that the encoding work and the multiplexing work can not be independently performed with high efficiency.

Figure 2:
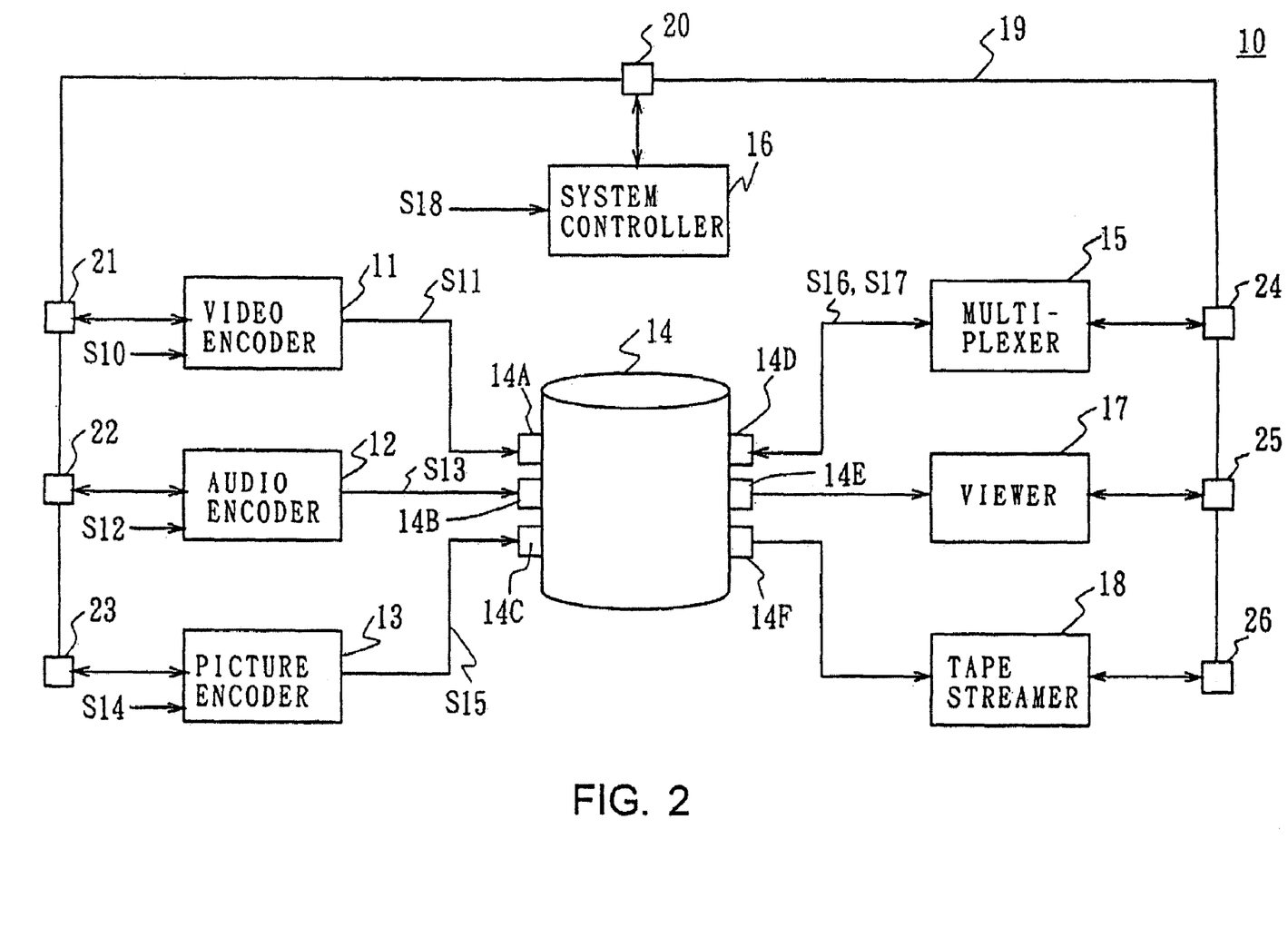
FIG. 2 is a block diagram showing the construction of an authoring apparatus according to one embodiment of this invention.

In FIG. 2, numeral 10 generally shows an authoring apparatus which applies this invention, which compressive-encodes images or sounds and multiplexes it so as to produce the recording data which is recorded in an optical disk of the DVD standards.

First, the authoring apparatus 10 is roughly composed of a plurality of encoding units 11 to 13 for encoding a moving picture, a still picture, or sounds, a storage unit 14 for storing the encoded data, a multiplexing unit 15 for multiplexing the encoded data to produce the recording data, and a control unit 16 for controlling the whole operation of the apparatus. In connection, additional apparatuses such as a decoding unit 17 for detecting the produced recording data and a recording unit 18 for recording the produced recording data in the predetermined area of a tape recording medium, etc. are provided in the authoring apparatus 10.

Here, the encoding unit 11 is composed of a video encoder for encoding a moving picture. The inputted video signal S10 is successively compressive-encoded based on the MPEG system, and the obtained video encoded data S11 is successively stored in a predetermined recording area of the storage unit 14 through the input port 14A. The encoding unit 11 receives the necessary information for encoding, such as the number of moving picture to be encoded and the address information of the recording area for storing the encoded data, etc. from the control unit 16 through the network 19, and then in accordance with these information, performs encoding to store the video encoded data S11 in the assigned recording area of the storage unit 14.

Also, the encoding unit 12 is composed of an audio encoder for encoding sounds, which successively encodes the inputted audio signal S12 in accordance with the MPEG audio system or the AC-3 system (the compressive-encoding method which combines the modified discrete cosine transform (MDCT) and the spectrum envelope encoding) and the obtained audio encoded data S13 is successively stored in a predetermined recording area of the storage unit 14 through the input port 14B. The encoding unit 12 also receives the necessary information for encoding, such as the number of sound to be encoded and the address information of the recording area for storing the encoded data, etc. from the control unit 16 through the network 19, and then in accordance with these information, performs encoding to store the audio encoded data S13 in the assigned recording area of the storage unit 14.

Also, the encoding unit 13 is composed of a picture encoder for encoding a still picture such as a caption, which successively encodes the inputted picture signal S14 formed by a caption, etc. in accordance with the MPEG system, the run length coding, or other encoding systems, and the obtained picture encoded data S15 is successively stored in a predetermined recording area of the storage unit 14 through the input port 14C. The encoding unit 13 also receives the necessary information for encoding, such as the number of picture to be encoded and the address information of the recording area for storing the encoded data, etc. from the control unit 16 through the network 19, and then in accordance with these information, performs encoding to store the picture encoded data S15 in the assigned recording area of the storage unit 14.

In connection, the transmission path such as SCSI which enables to transmit with high speed is used as a transmission path connecting respective encoding units 11 to 13 and the storage unit 14.

The data amount of the encoded still picture such as a caption is very small as compared with the encoded moving picture, so that the encoded still picture may be stored not in the storage unit 14 but in a memory of the system controller 16.

The storage unit 14 is composed of a hard disk having a plurality of input/output ports (14A to 14F) which store the inputted encoded data S11, S13, S15 respectively in the different recording areas. The storage unit 14 secures the recording area for storing the multiplexed data produced by the multiplexing unit 15 described later in addition to the recording area of the respective encoded data S11, S13, S15, so as to store the multiplexed data in the recording area. That is, the storage unit 14 has a sufficient recording area to store the respective encoded data S11, S13, S15 and the multiplexed data.

The multiplexing unit 15 is composed of a multiplexer, which successively reads from the storage unit 14 the respective encoded data S11, S13, S15 as data to be processed S17 through the input/output port 14D to multiplex them in the order that is in the line of the DVD standards. Then, the obtained multiplexed data S17 is successively stored in a predetermined recording area of the storage unit 14 through the input/output port 14D as recording data. The multiplexing unit 15 receives the necessary information for multiplexing, such as the address information of the recording area in which the respective encoded data S11, S13, S15 have been stored or the address information of the recording area for storing the multiplied data, etc. through the network 19 from the control unit 16. The multiplexing processing is performed in accordance with these information and the multiplexed data S17 is stored in the assigned recording area of the storage unit 14.

The decoding unit 17 is called a viewer, which detects whether or not the encoding processing of the respective encoded units 11 to 13 and the multiplexing processing of the multiplexing unit 15 are normally performed. The decoding unit 17 successively reads the multiplexed data S17 which has been stored in the storage unit 14, through the input/output port 14E to decode them. Then, the decoded data is output to the specified monitor (not shown). The decoding unit 17 is provided so that the authoring unit 10 can immediately and easily detect whether or not the encoding processing and the multiplexing processing are performed normally. In connection, the decoding unit 17 also receives the necessary information for decoding, such as the address information of the recording area in which the multiplexed data S17 has been stored or the information of the encoding method, etc. through the network 19 from the control unit 16. The decoding processing is performed in accordance with these information.

The recording unit 18 is called a tape streamer, which records the multiplexed data S17 in a predetermined recording medium in order to pass the multiplexed data S17 to a disk manufacturing process. The recording unit 18 receives the necessary information for recording, such as the address information of the recording area in which the multiplexed data S17 has been stored and the information of the recording method, etc. through the network 19 from the control unit 16. The multiplexed data S17 is successively read from the storage unit 14 through the output port 14F in accordance with these information and is recorded, for example, in a tape recording medium. The recording unit 18 is provided so that the authoring apparatus 10 can immediately and easily record recording data (S17) which is passed to the disk manufacturing process.

In connection, a transmission path such as SCSI which can also transmit data with high speed is used as a transmission path connecting the multiplexing unit 15, the decoding unit 17, the recording unit 18, and the storage unit 14.

The control unit 16 is composed of a system controller, which controls the operation of the respective encoding units 11 to 13, the multiplexing unit 15, the decoding unit 17, or the recording unit 18, and also controls the data recording area of the storage unit 14.

More specifically, the control unit 16 instructs each of the encoding units 11 to 13 to start the encoding processing in accordance with the necessary information (hereinafter, referred to as authoring sheet information S18) for authoring work which is inputted by an operator. Further, when the encoding processing of respective encoding units 11 to 13 is completed, the control unit 16 instructs the multiplexing unit 15 to start the multiplexing processing. Further, when the processing of the multiplexing unit 15 is completed, the control unit 16 instructs the decoding unit 17 and the recording unit 18 to start the processing.

Furthermore, the control unit 16 controls the recording area of the respective encoded data S11, S13, S15 produced by the respective encoding units 11 to 13 and the recording area of the multiplexed data S17 produced by the multiplexing unit 15. The control unit 16 assigns the different recording areas as an area for storing the data to each of the encoding units 11 to 13 respectively, and the recording area which is different from that of the encoding data S11, S13, S15 to the multiplexing unit 15 as an area for storing the data. In connection, since the encoded data S11, S13, S15 are only read from the multiplexing unit 15, the recording areas of the encoded data S11, S13, S15 are also assigned.

The control unit 16 is provided so that each of the units 11 to 13, 15 to 18 can execute the work which is assigned to themselves, and the storage unit 14 can be commonly used in the respective units not to overlap the area for storing each of the produced data S11, S13, S15.

In connection, the instruction of an operation and an area for storing data is given from the control unit 16 to each unit through the network 19. In addition, relays 20 to 26 which are shown in the figure correspond to an interface connecting each unit and the network 19.

Figure 3:
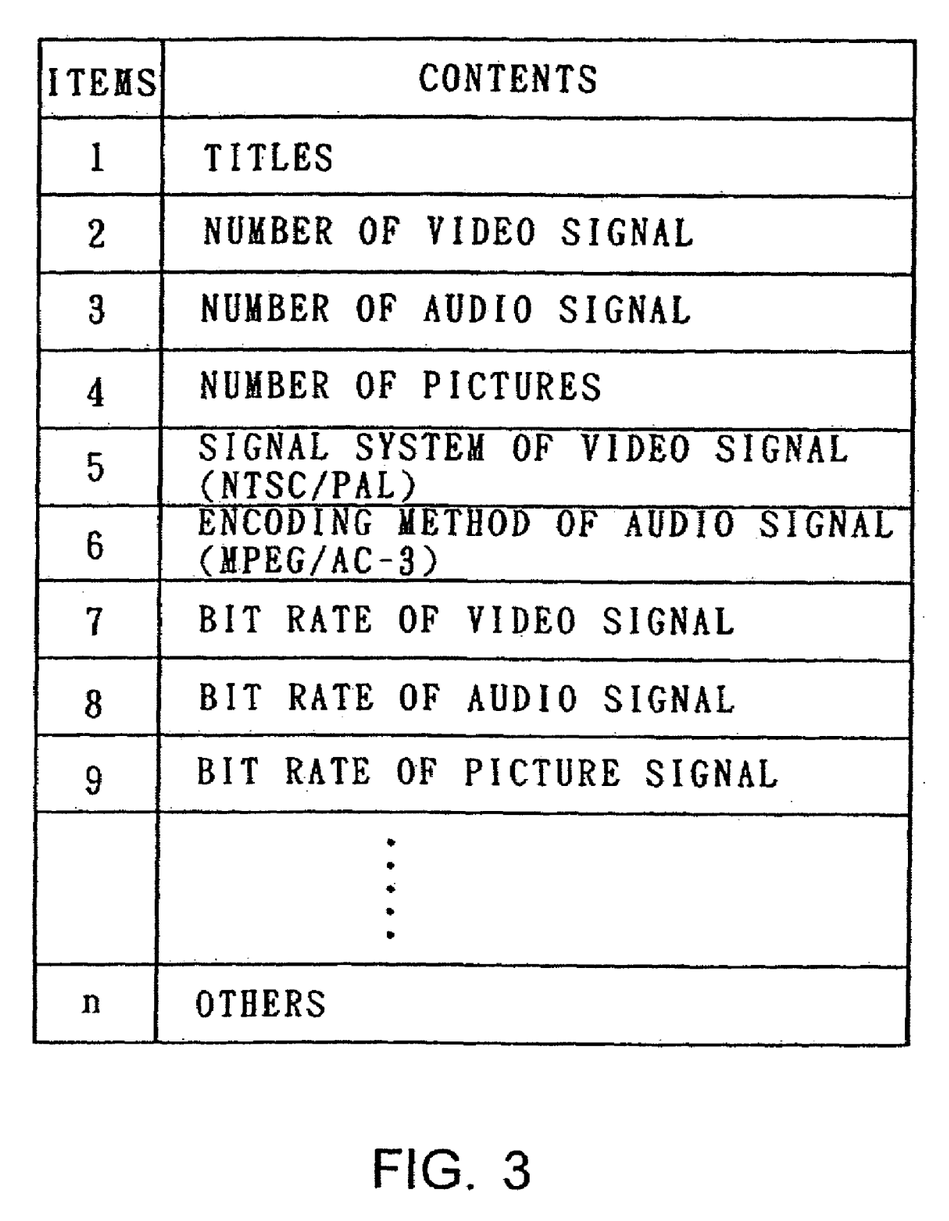
FIG. 3 is a table showing the contents of authoring sheet information.

Here, the authoring sheet information S18 described above will be explained. The various information necessary for authoring work are inputted as authoring sheet information S18 by an operator to the control unit 16. As shown in FIG. 3, the information includes "title", "number of video signal to be encoded", "number of audio signal to be encoded", "number of picture to be encoded", "signal system of video signal (NTSC/PAL)", "encoding system of audio signal (MPEG/AC-3)", and "bit rate of respective signals".

The inputted information is classified for each corresponding encoding unit in the control unit 16, and arranged as information necessary for encoding, i.e., an encoding list. The control unit 16 outputs the encoding list to each of the encoding units 11 to 13 as an instruction to start the processing. Each of the encoding units 11 to 13 starts the processing with the input of the encoding list being as a starting point. Firstly, it is determined that what encoding work is performed and the address information of the recording area in which the encoded data is stored is requested to the control unit 16. In response to the request, when the control unit 16 outputs the address information of the recording area in which the data is stored, each of the encoding units 11 to 13 starts the encoding processing actually.

Here, the processing performed between the control unit 16 and the respective units will be described below using a flow chart.

Figure 4:
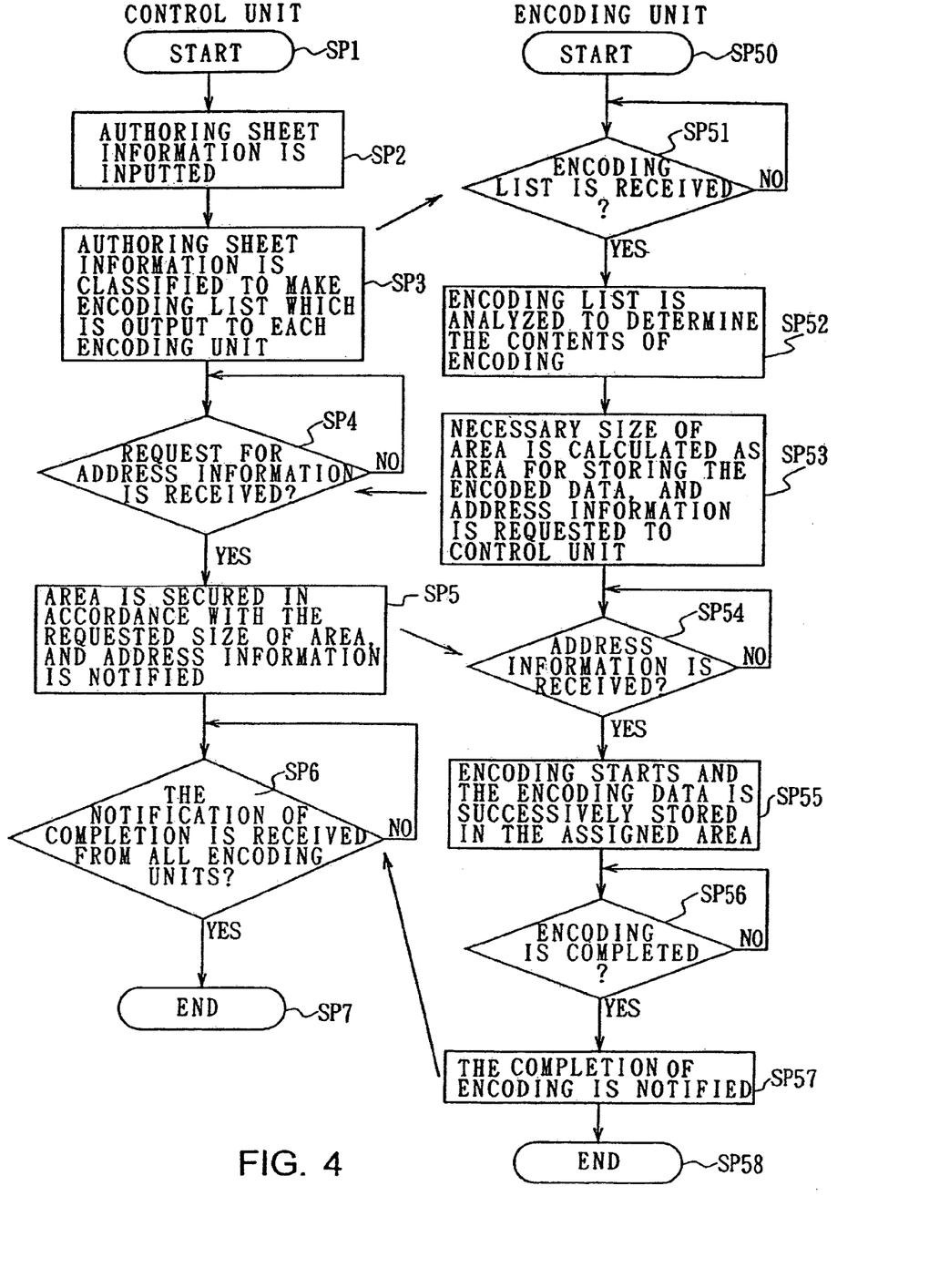
FIG. 4 is a flow chart explaining the processing performed between a control unit and an encoding unit.

First, the processing shown in FIG. 4 is performed between the control unit 16 and the encoding units 11 to 13. However, since the processing at the encoding units 11 to 13 are the same, only the encoding unit 11 will be described here.

At step SP2 after entering from step SP1, when the authoring sheet information S18 described above is inputted, the control unit 16 classifies the authoring sheet information S18 for each corresponding encoding unit at step SP3 to make an encoding list. The control unit 16 outputs the encoding list to the encoding units 11 to 13 and instructs to start the encoding processing.

At step SP51 after entering from step SP50, the encoding unit 11 decides whether or not the encoding list is received, and if it is received, proceeds to a following step SP52 where the encoding list is analyzed so as to determine the contents of the encoding processing. Next, at step SP53, the encoding unit 11 calculates the necessary size of the recording area of the storage unit 14 as an area in which the video encoded data S11 is stored, and notifies the size to the control unit 16 to request the address information of the area for storing.

At step SP4, the control unit 16 decides whether or not the request of address information is received from the encoding unit 11, and if it is received, proceeds to the following step SP5 where the recording area for storing the video encoded data S11 is determined out of free recording areas of the storage unit 14 in accordance with the requested size of area. The address information is informed to the encoding unit 11. In connection, the recording area determined by the control unit 16 is an area which is different depending on each encoding unit. The area is determined to be different for each encoding unit, so as to prevent the overlapping of the areas.

At step SP54, the encoding unit 11 decides whether or not the address information is received, and if it is received, proceeds to step SP55 to start the encoding processing. The obtained video encoded data S11 is successively stored in the recording area of the storage unit 14 indicated by the address information. Then, at the following step SP56, the encoding unit 11 decides whether or not the encoding processing is completed, and if it is completed, outputs the notification of completion of the encoding processing to the control unit 16 at next step SP57. In this time, the encoding unit 11 informs the control unit 16 of the data amount of the encoded data produced by the encoding processing for every predetermined units (frame unit in the case of the video encoded data, audio frame unit in the case of audio encoded data, and event unit in the case of the caption encoded data). Thereafter, the encoding unit 11 proceeds to next step SP58 to terminate the process.

On the other hand, at step SP6, the control unit 16 decides whether or not the notification of completion of the encoding processing are received from all of encoding units 11 to 13, and if the completion notification are received from all of the encoding units 11 to 13, proceeds to the following step SP7 to terminate the processing with the encoding units. Then, the control unit 16 proceeds to the next processing with the multiplexing unit. Besides, at step SP6, the control unit 6 decides whether or not all of data to be one stream by being multiplexed are encoded, if all of the data to be one stream by being multiplexed are encoded, may proceed to the following step SP7 to proceed to the processing with the multiplexing unit. The control unit 16 has the type (video, audio, subpicture) and the number of data to be one stream by being multiplexed, ID of the data as the authoring sheet information. Thereby, as soon as the data to be one stream by being multiplexing are assembled, the multiplexing work can be started.

In connection, although only the processing of the encoding unit 11 has been described here, the other encoding units 12, 13 also perform the same processing as that shown in FIG. 4. Further, the control unit 16 executes the processing indicated at step SP4 to step SP5 in accordance with the request from the encoding units 11 to 13, and notifies to the encoding units 11 to 13 the address information of area where the encoded data is stored. Further, in a case where the another processing is performed in parallel with the multiplexing processing, the processing shown in FIG. 4 may be performed in parallel with the multiplexing processing.

Figure 5:
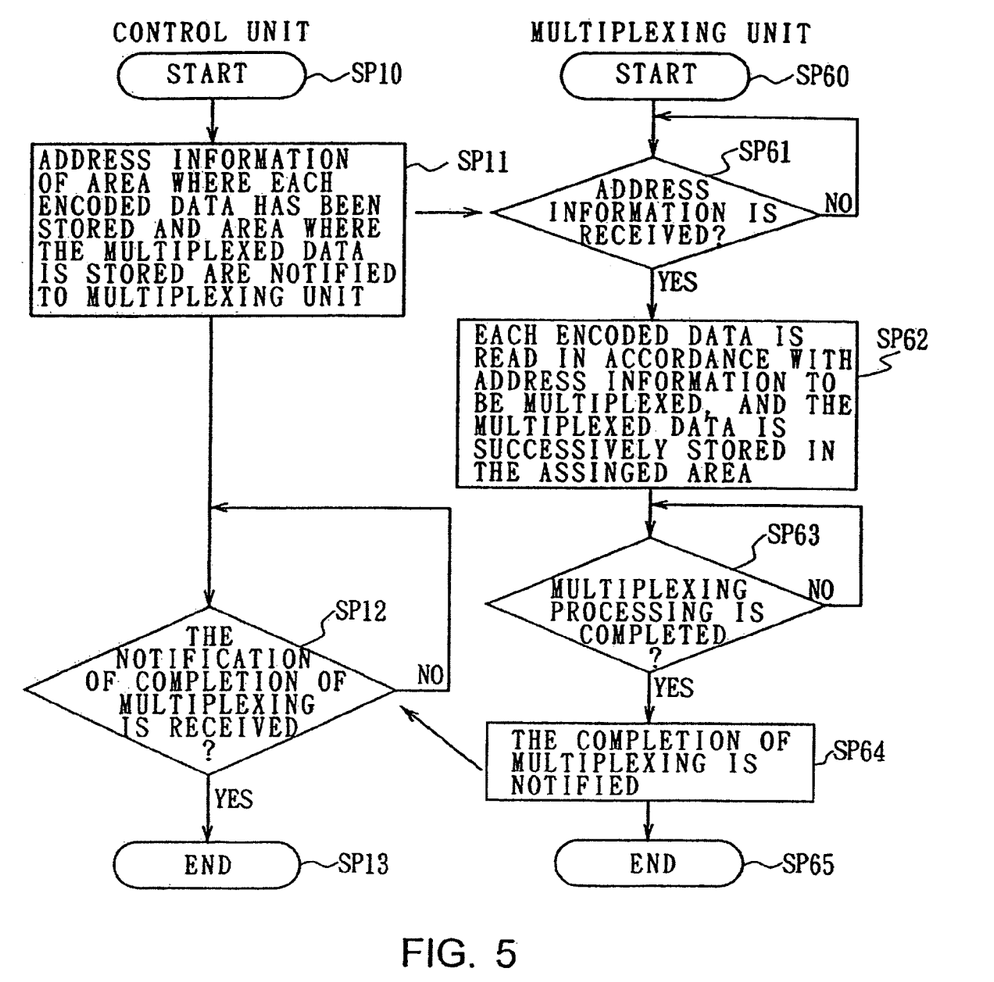
FIG. 5 is a flow chart explaining the processing performed between the control unit and a multiplexing unit.

Next, a processing between the control unit 16 and the multiplexing unit 15 will be described using the flowchart shown in FIG. 5. When the control unit 16 receives a notification of completion of the encoding processing from the encoding units 11 to 13, it terminates the processing shown in FIG. 4, and then proceeds to a processing with the multiplexing unit 15 shown in FIG. 5 to enter the multiplexing process.

First, at step SP11 after entering from step SP10, the control unit 16 notifies the multiplexing unit 15 of the address information of recording area of the storage unit 14 in which the encoded data (S11, S13, S15) have been stored, and at the same time, determines the area for storing the multiplexed data S17 which will be produced by the multiplexing unit 15 out of the free recording areas of the storage unit 14 to notify the multiplexing unit 15 of the address information of the recording area. Thereby, the control unit 16 instructs the multiplexing unit 15 to start the multiplexing processing. In connection, the recording area for storing the multiplexed data S17 is different from the recording area of the encoded data S11, S13, S15. By deciding in this way, overlapping of areas is prevented. Further, in this time, the control unit 16 informs the multiplexing unit 15 of the data amount of the encoded data S11, S13, S15 to be multiplexed for every predetermined unit.

At step SP61 after entering from step SP60, the multiplexing unit 15 decides whether or not the address information and the information on data amount are received from the control unit 16, and if it is received, proceeds to the following step SP62 where the encoded data (S11, S13, S15) are read in accordance with the address information and the information on data amount from the control unit 16 to multiplex it in the order of the DVD standards. The obtained multiplexed data S17 is successively stored in the assigned recording area of the storage unit 14. At next step SP63, the multiplexing unit 15 decides whether or not the multiplexing processing is completed, and if it is completed, proceeds to the following step SP64 to output a notification of completion of the multiplexing processing to the control unit 16. Thereafter, the multiplexing unit 15 proceeds to the next step SP65 to terminate the processing.

On the other hand, at step SP12, the control unit 16 decides whether or not the notification of completion of the multiplexing processing is received from the multiplexing unit 15, and if it is received, proceeds to the following step SP13 to terminate the processing regarding that the multiplexing processing of the multiplexing unit 15 is completed.

In connection, in the case where other processing is performed in parallel with a detecting processing described later, the processing shown in FIG. 5 may be performed in parallel with the detecting processing.

Next, a processing between the control unit 16 and the decoding unit 17 will be explained using the flowchart shown in FIG. 5. The control unit 16 receives a notification of completion of the multiplexing processing from the multiplexing unit 15 to terminate the processing shown in FIG. 4, and then proceeds to the processing shown in FIG. 5 with the decoding unit 17 to enter the detecting process.

Figure 6:
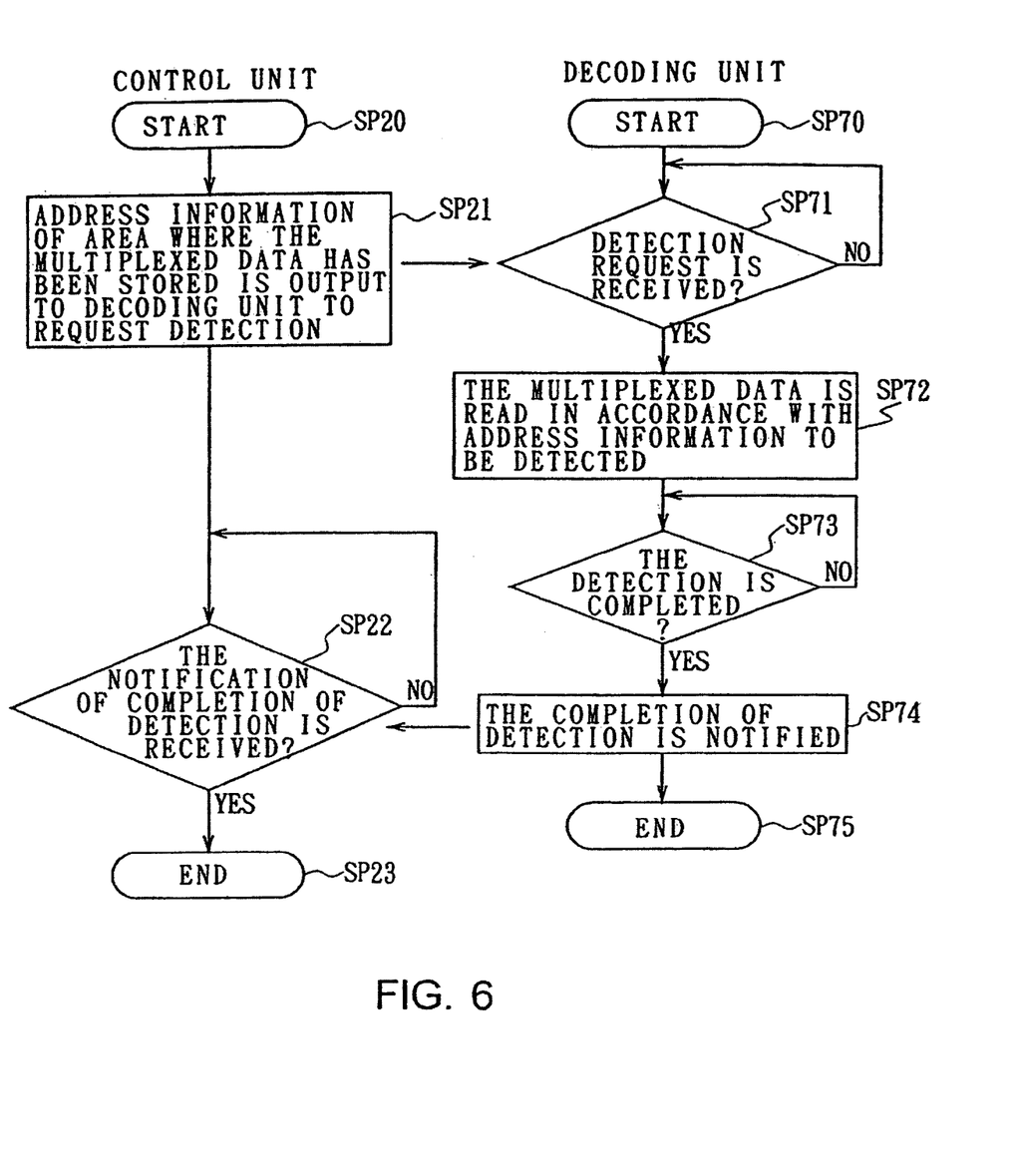
FIG. 6 is a flow chart explaining the processing performed between the control unit and a decoding unit.

First, at step SP21 after entering from step SP20, the control unit 16 outputs the address information of the recording area of the storage unit 14 in which the multiplexed data S17 has been stored to the decoding unit 17, so as to request the detection of the multiplexed data S17 to the decoding unit 17.

At step SP71 after entering from step SP70, the decoding unit 17 decides whether or not the detection request is received from the control unit 16, and if it is received, proceeds to step SP72 to read the multiplexed data S17 from the storage unit 14 in accordance with the address information from the control unit 16. The multiplexed data S17 is successively demultiplexed and decoded so that it is detected if the encoding processing and multiplexing processing are normally performed. In this time, the decoded data is displayed on the monitor (including a speaker), and an operator can watch it to check the picture quality, sound quality, and so on. Then, at the following step SP73, the decoding unit 17 decides whether or not the detection is completed, and if it is completed, proceeds to the following step SP74 to output a notification of the completion of the detection (the detected result is included) to the control unit 16. After that, the decoding unit 17 proceeds to the next step SP75 to terminate the processing.

On the other hand, at step SP22, the control unit 16 decides whether or not the notification of completion of the detection is received from the decoding unit 17, and if it is received, proceeds to the following step SP23 to terminate the processing regarding that the detecting processing of the decoding unit 17 is completed.

In connection, in the case where other detecting processing is performed in parallel with the recording processing described later, the processing shown in FIG. 6 may be performed in parallel with the recording processing.

Figure 7:
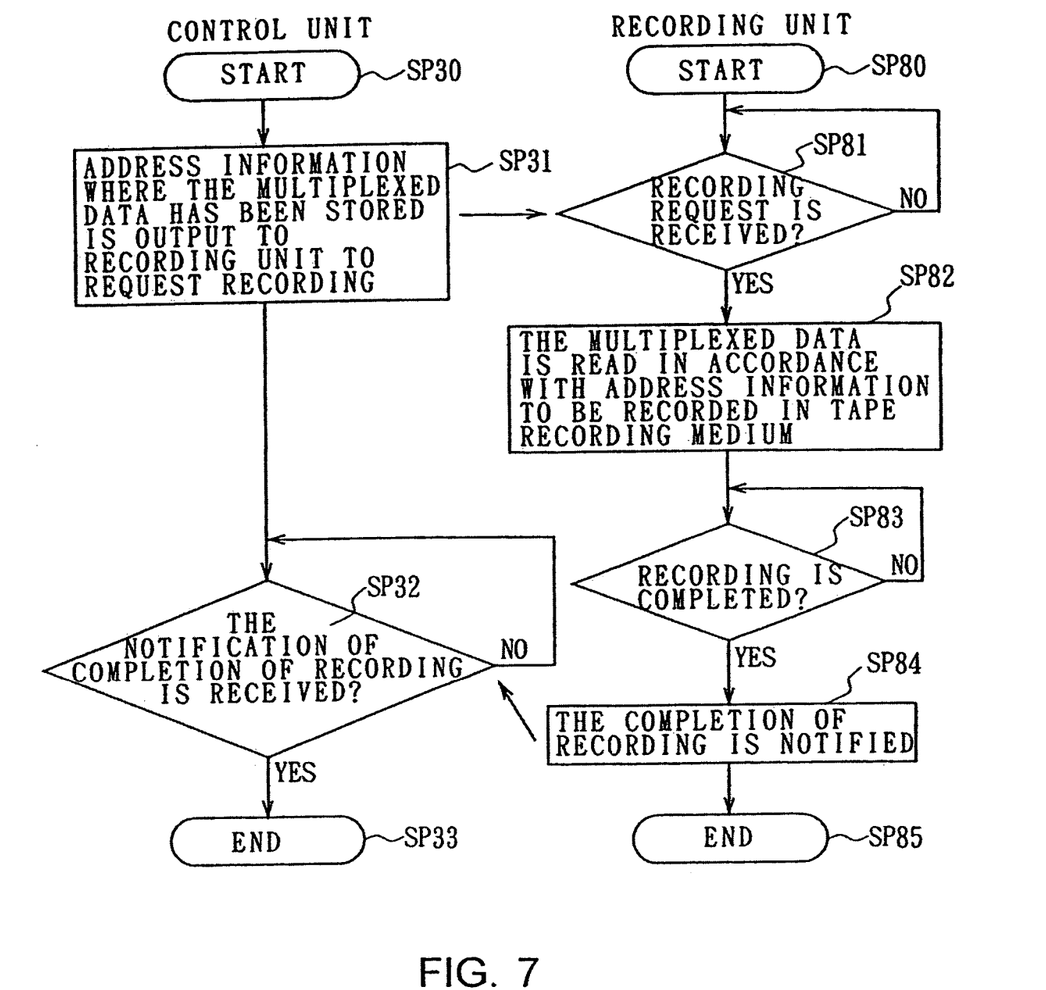
FIG. 7 is a flow chart explaining the processing performed between the control unit and a recording unit.

Next, a processing between the control unit 16 and the recording unit 18 will be described using the flowchart shown in FIG. 7. When the control unit 16 receives the notification of completion of the detection from the decoding unit 17 and terminates the processing shown in FIG. 6, it proceeds to a processing with the recording unit 18, as shown in FIG. 6 to enter a recording process if the detected result is satisfactory.

First, at step SP31 after entering from step SP30, the control unit 16 outputs the address information of the recording area of the storage unit 14 in which the multiplexed data S17 has been stored, so as to request the recording unit 18 to record the multiplexed data S17.

At step SP81 after entering from step SP80, the recording unit 18 decides whether or not the recording request is received from the control unit 16, and if it is received, proceeds to the following step SP82 to read the multiplexed data S17 from the storage unit 14 in accordance with the address information from the control unit 16, and successively record it in a predetermined tape recording medium. Then, at the next step SP83, the recording unit 18 decides whether or not the recording processing is completed, and if it is completed, proceeds to the next step SP84 to output the notification of completion of recording processing to the control unit 16. After that, the recording unit 18 proceeds to the next step SP85 to terminate the processing.

On the other hand, at step SP32, the control unit 16 decides whether or not the notification of recording completion is received from the recording unit 18, and if it is received, proceeds to the following step SP33 to terminate the processing regarding that the recording processing of the recording unit 18 is completed.

With the above construction, in the authoring apparatus 10, the storage unit 14 having a plurality of input/output ports is provided to be commonly used between the units (11 to 13, 15, 17, 18). At this time, the control unit 16 controls the recording area of the storage unit 14 not to overlap the recording areas of the storage unit 14 between the respective units. Therefore, in the authoring apparatus 10, the overlapping of the recording area is prevented and the storage unit 14 is commonly used, so as to perform the editing work efficiently.

In addition, the authoring apparatus 1 shown in FIG. 8 comprises storage units 2B to 5B in respective units (2 to 5). Thereby, for example, when a processing proceeds to the next multiplexing processing after the encoding processing, the encoded data S1 to S3 must be transmitted from the storage units 2B to 4B to the storage unit 5B, and next encoding work can not be performed at the encoder 2A, 3A, 4A until the transmitting processing is terminated. Therefore, the editing work takes much time as a whole in the authoring apparatus 1. However, the authoring apparatus 10 according to this embodiment adopts the storage unit 14 which is commonly used by all of units, so that the data transfer is not performed. In the authoring apparatus 10, the enough recording area of the storage unit 14 is previously secured, and respective encoding units 11 to 13 can proceed to another encoding processing after the encoding processing without waiting the work of multiplexing unit 15. The work is not interrupted. Similarly, the multiplexing unit 15 also can proceed to another multiplexing processing without waiting the work of detecting processing of the decoding unit 17, and the work is not interrupted. In this way, in the case of the authoring apparatus 10, the storage unit 14 is commonly used between respective units, so that each of units can operate independently. Thereby, the interruption of work can be prevented to reduce the working time as a whole, so as to improve the working efficiency comparing to the conventional apparatus.

Further, in the case of the authoring apparatus 1, when the picture to be encoded does not exist, for example, the recording unit 4B of the encoding unit 4 is not used and the storage area of the storage unit 4B may be useless. However, in the authoring apparatus 10 according to this embodiment, the recording area for picture can be assigned to another unit even if the picture to be encoded does not exist, so that the recording area of the storage unit 14 can be utilized effectively.

Further, in the case of the authoring apparatus 10, the storage unit is arranged as one unit, so that the construction can be simplified comparing to the case where the storage unit is dispersed in respective units as shown in FIG. 1.

In connection, in the authoring apparatus 10 according to this embodiment, since the storage unit 14 is only commonly used in the encoding units 11 to 13, the multiplexing unit 15, the decoding unit 17, and the recording unit 18, respective units are positioned in separate rooms so as to separate the working space.

With the above construction, the storage unit 14 which is commonly used by the units 11 to 13, 15, 17, 18 is provided, and the recording area of the storage unit 14 is controlled by the control unit 16 to store the respective encoded data S11, S13, S15, and the multiplexed data S17 in the storage unit 14, so that a data transfer between respective units becomes unnecessary. Therefore, the operation interruption is prevented and the working time can be reduced. The authoring apparatus 10 which improves the working efficiency comparing to the conventional apparatus can be realized.

Note that in the embodiment discussed above, a plurality of output ports 14D to 14F are provided at the storage unit 14 to perform the detecting processing and the recording processing by providing the decoding unit 17 and the recording unit 18. However, this invention is not limited to this, but an authoring apparatus may have, at least, a multiplexing unit 15, so that the storage unit 14 may have, at least, one output port.

Further, in the embodiment discussed above, the multiplexed data S17 is recorded in a tape recording medium by the recording unit 18. However, this invention is not only limited to this, but the multiplexed data may be recorded in other recording medium such as a magnetic disc by the recording unit 18, and the same effect as the above case can be obtained.

Further, in the embodiment discussed above, encoding units (11 to 13) are provided for a moving picture (S10), sounds (S12), and a still picture (S14) respectively. However, this invention is not only limited to this, but the encoding processing can be performed in parallel by providing the encoding units respectively for the moving picture, sounds, and still picture. Moreover, this invention is not only limited to this, but a plurality of multiplexing unit can be also provided to perform the multiplexing processing in parallel. Thus, the work efficiency can be improved significantly.

Furthermore, in the embodiment discussed above, this invention is applied to the authoring apparatus for producing the recording data (S17) which is recorded in an optical disc such as a DVD. However, this invention is not only limited to this, but widely applicable to the editing apparatus for producing the recording data which is recorded in other recording medium such as a video CD, CD-ROM, etc.

According to this invention, there is provided a storage means having a plurality of input ports and at least one output port, and a control means for controlling the recording area of the storage means, in which a different recording area is assigned as an area for storing the encoded data to a plurality of encoding means, and the recording area in which the encoded data has been stored and the recording area which is different from that of the encoded data is assigned as an area for storing the multiplexed data to the multiplexing means. Therefore, the storage means can be commonly used between the encoding means and multiplexing means, and a data transfer between the encoding means and the multiplexing means is not performed so as to prevent the work interruption. Thus, the editing apparatus which improves the work efficiency comparing to a conventional apparatus can be realized.

Further, according to this invention, the inputted plural images or sounds are respectively encoded, and the encoded data are respectively stored in the different recording area of the storage means. The encoded data are respectively read from the storage means to be multiplexed, so as to produce the multiplexed data. The multiplexed data is stored as recording data in the recording area which is different from that of the encoded data out of the recording areas of the storage means. The storage means is commonly used between the encoding processing and the multiplexing processing to produce the recording data, so that the data transfer between respective processing becomes unnecessary and the work interruption is avoided. Therefore, the data editing method which improves the work efficiency comparing to the conventional apparatus can be realized.

While there has been described in connection with the preferred embodiments of the invention, it will be obvious to those skilled in the art that various changes and modifications may be aimed, therefore, to cover in the appended claims all such changes and modifications fall within the true spirit and scope of the invention.

What is claimed is:

1. An editing system for encoding a plurality of images or sounds and multiplexing plural encoded data so as to produce recording data which is recorded in a recording medium, said editing system comprising:
   a system controller;
   a single storage unit having a plurality of input ports and at least one output port;
   a plurality of encoding devices for encoding inputted images or sounds, and for successively storing encoded data in a recording area of said single storage unit specified by said system controller through said input ports and for outputting a data amount of the encoded data for every predetermined unit to said system controller;
   a multiplexing unit for reading said encoded data to be multiplexed from said single storage unit through said output port so as to produce the multiplexed data, and for storing the multiplexed data in a predetermined recording area of said single storage unit through one of said input ports as recording data; and
   a recording unit for reading said multiplexed data from said single storage unit through said at least one output port to record said multiplexed data in a predetermined recording medium as said recording data, said recording unit being a tape streamer;
   wherein when each of said plurality of encoding devices receives an encode list from said system controller, then each of said plurality of encoding devices requires address information of a recording area of a single storage unit, and thereby said system controller specifies the recording area for each of said plurality of encoding devices and sends information of the specified recording area for each of said plurality of encoding devices.

* * * * *